United States Patent

Hanaoka

[15] 3,697,832

[45] Oct. 10, 1972

[54] PLURAL PHOTO-DIODE TARGET ARRAY

[72] Inventor: Masafumi Hanaoka, Tokyo, Japan

[73] Assignee: Nippon Electric Co., Ltd., Tokyo, Japan

[22] Filed: Jan. 21, 1971

[21] Appl. No.: 108,301

[30] Foreign Application Priority Data

Jan. 23, 1970 Japan ..........................45/6645

[52] U.S. Cl. .....317/235 R, 317/235 N, 317/235 NA, 317/235 AN

[51] Int. Cl. ..............................................H01l 15/00

[58] Field of Search ....................317/235 N, 235 NA

[56] References Cited

UNITED STATES PATENTS

| | | | |
|---|---|---|---|
| 3,548,233 | 12/1970 | Cave | 313/65 |
| 3,574,143 | 4/1971 | Vratny | 252/520 |

*Primary Examiner*—Martin H. Edlow
*Attorney*—Sandoe, Hopgood and Calimafde

[57] ABSTRACT

A plural photo-diode array, used as a target for silicon visicon image transmitting apparatus, employs a substrate having an impurity concentration profile which decreases about one substrate surface. The diodes are formed by diffused areas at that substrate surface comprising an impurity of opposite conductivity types.

1 Claim, 5 Drawing Figures

INVENTOR
MASAFUMI HANAOKA by
Sandoe, Hopgood & Calimafde
ATTORNEYS.

*INVENTOR*
MASAFUMI HANAOKA by
Sandoe, Hopgood & Calimafde
ATTORNEYS

PLURAL PHOTO-DIODE TARGET ARRAY

DISCLOSURE OF THE INVENTION

This invention relates to semiconductor apparatus and, more specifically, to an improved photo-diode target array employed in an image transmitting tube, also deemed a silicon visicon target.

A most difficult problem in the target of a conventional silicon visicon is the "White Defect" appearing on the image plane. This white defect is produced at the image plane when only one defective diode exists within an array composed of several hundred thousand photo-diodes. The defect sometimes increases in number rapidly depending upon the voltage applied on the target, or increases in area (white clouding around the spot of the white defect), rendering the transmission of an image impossible. This white clouding phenomenon will now be explained with reference to FIG. 1. In FIG. 1*a*, there is indicated a sectional view, much enlarged, of the photo-diode array. A passivating insulating layer 2 is provided on the surface of a silicon monocrystalline substrate 1. Impurities of an opposite conductivity to the substrate are diffused through holes opened in the insulating layer 2, so that a plurality of island-shaped regions 3 are obtained thereby forming the photo-diode array. A scanning electron beam 4 acts as a kind of lead and the diode 5 irradiated by the electron beam 4 may be considered to be grounded. Accordingly, a voltage is applied from a voltage source 6, also supplying a voltage to the target, to the substrate 1 through a load resistor 7, whereby the diode is placed in the reverse biased condition and a depletion layer 8 is formed near the P-N junction.

If there is any defect in the photo-diodes composing the target array, a short-circuited current flows when the electron beam 4 scans that defective diode. Accordingly, a white spot 13 appears on the image displaying surface as shown in FIG. 1*b*. In the photo-diode array of the construction shown in FIG. 1*a*, the insulating layer 2 is generally made of an extremely good insulating substance such as $SiQ_2$. When the scanning electron beam impinges upon the surface of the insulating layer, negative charges 9 are retained on the insulating surface. The negative charges 9 remain on the surface for a relatively long period, and a reversing condition for conductivity due to an MOS effect is caused in the semiconductor immediately below the insulating layer 2. This reversed condition of the conductivity in the semiconductor is identified as channel 10 in FIG. 1*a*.

The photo-diode array target formed with the channel 10 may constitute a series circuit of an MOS transistor having a source electrode consisting of a defective diode 11 and a drain electrode consisting of a diode 5 irradiated by the electron beam 4, whereby a current path 12 indicated by the dotted arrow line is formed. As a result, when the voltage applied to the target is elevated as indicated in FIG. 1*b*, white clouding areas 14 are grown around the white spots 13, and the areas 14 are merged into a white clouding area 15. Ultimately, the image displaying surface becomes white, and image transmission is rendered impossible.

For the purpose of eliminating the above described drawback, a photo-diode target array is currently provided with a semiconductor layer 17 having a suitable resistance so that the electric charge 16 can flow laterally between the surface of the insulating layer 2 and the surface of the diode layers 3 as shown in FIG. 2. According to the Bell System Technical Journal, May–June, 1969, pp. 1,506–1,516, the resistance value required for the resistance layer 17 is about $5 \times 10^{13}$ ohms/cm$^2$, and the material employed for this resistance must be sufficiently heat-resistant so that its resistance value does not change even if the material undergoes baking at a sufficiently high temperature as characterizes silicon visicon tubes. For this reason, selection of the material suitable for the resistance layer 17, and its formation, have been extremely difficult.

Therefore, it is an object of the present invention to provide a photo-diode target array wherein the above discussed channel is not formed in the semiconductor substrate just below the insulating layer for a voltage range sufficient for operating the silicon visicon, and without employing the above mentioned semi-insulating layer 17.

The above and other objects of the present invention are realized in an illustrative embodiment of the present invention, described in detail hereinbelow in conjunction with the accompanying drawing, in which:

FIGS. 1*a* and 1*b* respectively depict a prior art photo-diode array, and an image deficiency due to defects in the array, as discussed above;

Figure 1A:
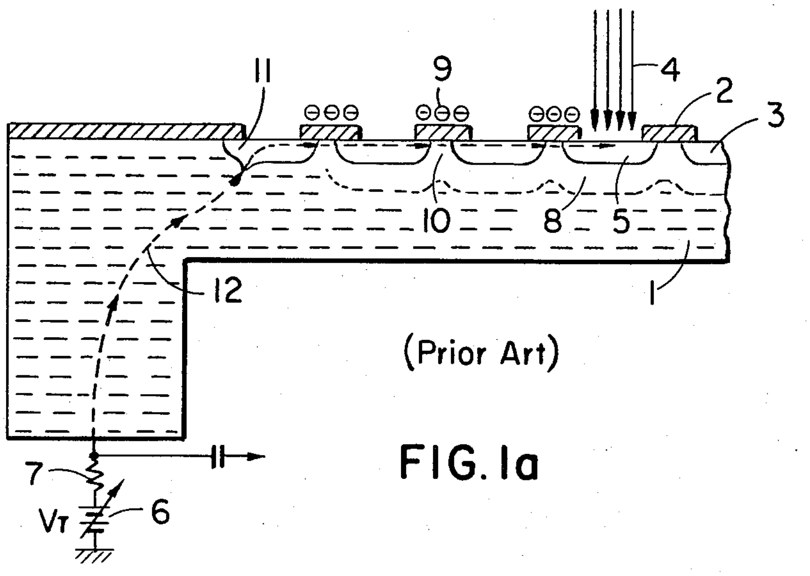
Figure 1B:
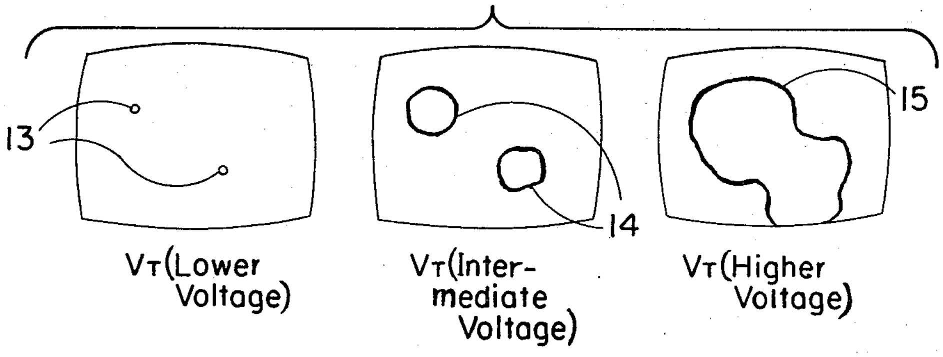
Figure 2:
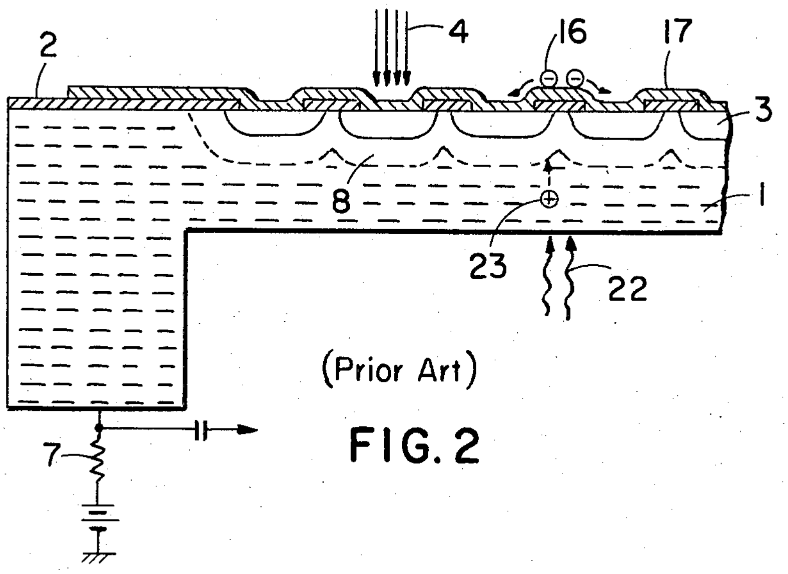
FIG. 2 is a cross sectional view depicting a prior art photo-diode target array wherein variation in an image caused by defective diodes is minimized.
Figure 3:
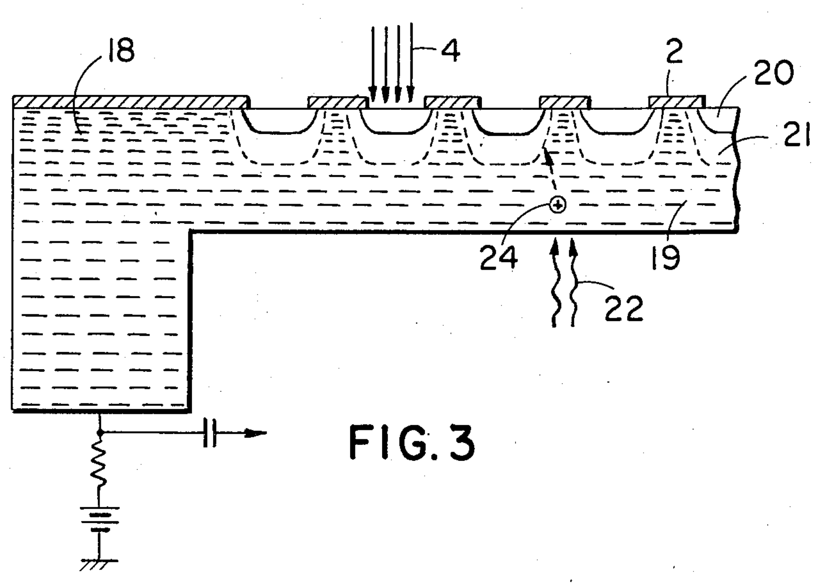
FIG. 3 is a cross sectional view showing a photo-diode array target in accordance with the present invention.

Referring now to FIG. 3, there is illustrated a sectional view, in much enlarged scale, of a photo-diode target array according to the present invention. In comparison with the construction shown in FIG. 1*a*, the impurity concentration distribution inside of the substrate 19 gradually increases toward the surface on which impurities of an opposite conductivity type are diffused for forming the diode array. More specifically, before the diode array is formed, antimony is diffused from the surface of the substrate to form a concentration profile 18, described below, inside the substrate 1. Then, an insulating layer 2 is formed on the surface of the substrate 1, holes are provided through the insulating layer 2, and the diodes 20 are formed. For the FIG. 3 structure, the width of the diodes 20 is less than that of the above described diodes 3 formed on a substrate of uniform concentration as indicated in FIGS. 1 and 2. Further, the shape of the depletion layer 21 formed during operation of the target is different from those in conventional constructions. That is, the thickness of the depletion layer is made thinner in the portions of the substrate where the impurity concentration is high in the substrate. For this reason, the depletion layer in FIG. 3 is far more independent than depletion layer 8 in FIG. 2. This fact is advantageous for increasing the resolution of a formed image in view of the diffusion process of positive holes 24 as compared with that for positive holes 23 in FIG. 2.

Figure 4:
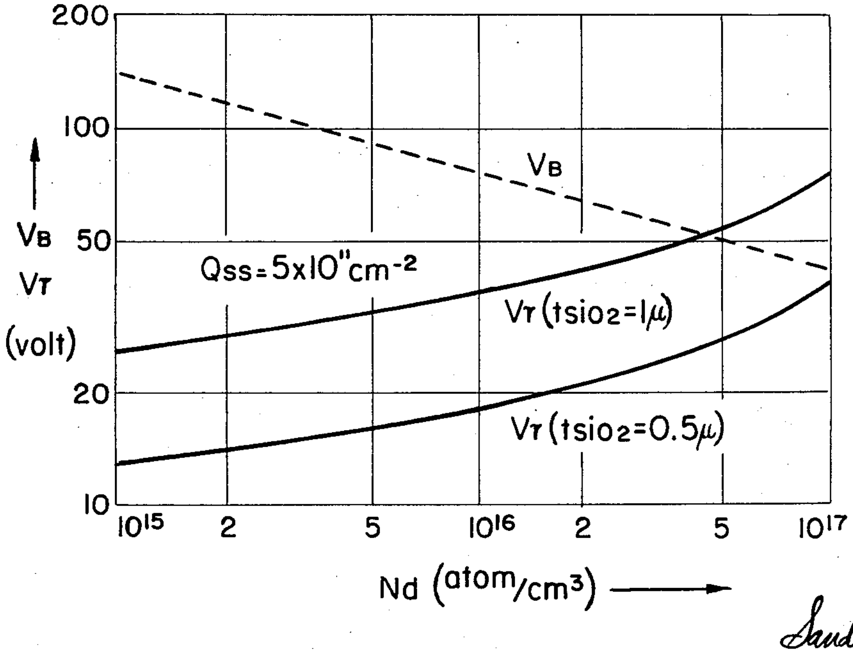
FIG. 4 graphically depicts relationships useful for presenting the present invention.

The formation of a channel in the MOS transistor is attained when the voltage applied across the insulating layer exceeds a threshold value therefore. Assuming that the impurity concentration is Nd, the concentration of majority carriers in the substrate is $n$, the concentration of minority carriers in the substrate is $p$, an electron charge is $q$, the substrate thickness is $x$, Debye length is $x_l$, electric charge in the boundary surface between the substrate Si and $SiO_2$ is Qss, then the threshold voltage $V_T$ can be expressed as $$V_T=\left[Qss-q\int_0^\infty (Nd-n)dx-q\int_{x1}^\infty pdx\right]/Co \qquad (1)$$

wherein $Co$ is the capacitance per unit area of the insulating layer. The electric charge $Qss$ on the layer of $SiO_2$ which has been carefully produced is about $5 \times 10^{11}$ ions $cm^{-2}$. Taking the thickness of the $SiO_2$ layer as a parameter, the relationships between the impurity concentration in the substrate $Nd$ and the threshold voltage $V_T$ are indicated in the graph of FIG. 4 by solid lines. As is apparent from the graph, the impurity concentration in the silicon substrate employed as a target of the typical silicon visicons is about $10^{15}$ (atom/$cm^3$), and the thickness of the $SiO_2$ surface insulating layer is about 1 micron. Accordingly, those units having no semi-insulating layer, or having a semi-insulating layer exhibiting too high a resistance value, will develope the above mentioned channels just underneath the $SiO_2$ oxide layer when the target voltage is raised near 20 volts. White clouding will thus appear in the image, and image transmission is made impossible.

In the silicon p channel MOS transistors now commonly available, a substrate of about $10^{15}$ (atom/$cm^3$) is employed, and the thickness of the gate oxide layer is about 0.15 microns, so that the threshold value is near 3 volts. This fact may also be derived from the relations shown in FIG. 4. When the impurity concentration in the silicon substrate employed in the photo-diode array is increased so that formation of the channels is made difficult, the yielding voltage of the diodes is lowered, and from this fact the upper limit of the impurity concentration of the surface of this substrate is determined. Measured values of the yielding voltage $V_B$ of the silicon diodes are indicated in FIG. 4 by dotted lines. From these curves, it is found that an impurity concentration profile comprising about $5 \times 10^{16}$ (atom/$cm^3$) at the surface of the target; a gradually decreasing concentration to a depth of several microns; and about $10^{15}$ (atom/$cm^3$) concentration at that depth and the lower portion of the substrate is best suited for the production of a silicon vidicon wherein no semi-insulating layer is employed, and which is operable in a stable condition.

The above described arrangement is merely illustrative of the principles of the present invention. Numerous modifications and adaptations thereof will be readily apparent to those skilled in the art without departing from the spirit and scope of the present invention.

What is claimed is:

1. A photo-diode array target characterized in that a silicon monocrystalline substrate includes a first impurity concentration distribution comprising about $5 \times 10^{16}$ (atom/$cm^3$) at the surface of said substrate, $10^{15}$ (atom/$cm^3$) at depth in said substrate greater than several microns from said substrate surface, said first impurity concentration gradually decreasing from $5 \times 10^{16}$ to $10^{15}$ (atom/$cm^3$) in said depth of several microns in said substrate from said substrate surface, and wherein a second impurity having an opposite conductivity to that of the substrate is diffused from the surface of said substrate having said higher impurity concentration, whereby plural diodes are arranged on the surface of the substrate in a mosaic manner.

* * * * *